(12) United States Patent
Kataria et al.

(10) Patent No.: US 6,385,172 B1
(45) Date of Patent: May 7, 2002

(54) ADMINISTRATIVE WEIGHT ASSIGNMENT FOR ENHANCED NETWORK OPERATION

(75) Inventors: Deepak Kataria, Edison; Dimitris Logothetis, North Bergen; Santhanam Srinivasan, Holmdel; Malathi Veeraraghavan, Atlantic Highlands, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/272,720

(22) Filed: Mar. 19, 1999

(51) Int. Cl.[7] ................. H04J 1/16; H04J 3/14
(52) U.S. Cl. ...................... 370/238; 370/238
(58) Field of Search ................. 370/229, 230, 370/230.1, 231, 232, 235, 238–238.1; 709/200, 230, 241, 240, 232–235

(56) References Cited

U.S. PATENT DOCUMENTS

| | | | | |
|---|---|---|---|---|
| 5,596,722 A | * | 1/1997 | Rehnema | ................. 370/400 |
| 5,870,564 A | * | 2/1999 | Jensen et al. | ................. 709/241 |
| 5,930,348 A | * | 7/1999 | Regnier et al. | ............. 379/221 |
| 6,067,572 A | * | 5/2000 | Jensen et al. | ................. 709/241 |
| 6,084,858 A | * | 7/2000 | Matthews et al. | .......... 370/238 |

* cited by examiner

Primary Examiner—Ajit Patel
(74) Attorney, Agent, or Firm—Wilford L. Wisner (57) ABSTRACT

Methods and communication networks having a plurality of connection-oriented switches in which administrative weights are assigned based on link call blocking probabilities. Three assignment schemes include, first, a solution that can be built in the switch software of sufficiently similar switches to enable the switches to determine administrative weights for their links. The second and third schemes employ administrative weight management stations. The second scheme uses an administrative weight management station that operates to enhance total network revenue or throughput in a communication network in which all of the switches implement a certain type of accounting management information databases (MIB). The third scheme uses an administrative weight management station that computes administrative weights for switches that do not have the capability for the second scheme, but which employ appropriate MIBs.

20 Claims, 11 Drawing Sheets

ENHANCEMENT TO SWITCH CAC SOFTWARE $na[l][s]$: NUMBER OF ATTEMPTED CALLS FOR CLASS s THAT USE LINK l
$nr[l][s]$: NUMBER OF REJECTED CALLS FOR CLASS s THAT USE LINK l

*FIG. 1*

ENHANCEMENT TO SWITCH CAC SOFTWARE

FIG. 2
AW MANAGEMENT MODULE (AMM) AT A NODE

FIG. 3

SYSTEM FOR PREFERRED EMBODIMENT OF METHOD 1

FIG. 4
TYPE I ADMINISTRATIVE WEIGHT MANAGER

FIG. 5

FIG. 6
CONVERSION OF HOST-TO-HOST TRAFFIC TO SWITCH-TO-SWITCH TRAFFIC

FIG. 7A

AW COMPUTATION BASED ON ACCOUNTING INFORMATION

FIG. 7C

AW ASSIGNMENT BASED ON ACCOUNTING INFORMATION AT EACH NODE (DISTRIBUTED SOLUTION)

FIG. 9

AN EMBODIMENT OF BLOCK TA: READ_INFO
OF FIGURE 7A FOR ATM NETWORKS

ADMINISTRATIVE WEIGHT ASSIGNMENT FOR ENHANCED NETWORK OPERATION

TECHNICAL FIELD

This invention relates generally to the field of telecommunications and in particular to methods for assigning administrative weights pertaining to path selection in a communication network.

BACKGROUND OF THE INVENTION

In many present networks, administrative weights are used as link weights in path-selection methods, for instance, in those methods using a shortest path algorithm, such as Dijkstra's algorithm for route computation. Each link can have one administrative weight assigned for each possible class of service. The administrative weight of a path is the sum of the administrative weights of the component links. The administrative weight (hereinafter, AW) is typically a measure of the administrative policy or preference for usage of a link for the relevant class of service. Hence, links and paths with lower AWs are preferred by path selection methods over paths with higher AWs. Administrative weights thus enable a type of automatic path selection.

Nevertheless, assignment of administrative weights in the existing fashion based on some static assignment scheme can be overly pessimistic and result in unnecessary denials of service.

SUMMARY OF THE INVENTION

According to the present invention, administrative weights are assigned to links based on link call-blocking probabilities.

A first species of the invention employs switches of a uniform type and provides supplemental switch software to enable the switches to determine call-blocking probability and therefrom assign administrative weights for their links.

A second species of the invention employs an administrative weight network management station that monitors call-level statistics and obtains therefrom call-blocking probabilities. It determines the administrative weight values to be assigned to links to reflect call-blocking probabilities. Working with switches that satisfy certain standard conditions, the administrative weight network management station executes a network-wide optimization based on revenue optimization, which reflects traffic optimization. It determines AW values that tend to maximize total network throughput. The separate module for this species is called a Type I administrative weight network management station.

A third species of the invention employs an administrative weight network management station that monitors call-level statistics and derives call-blocking probabilities either for a switch or for a group of switches. It determines the administrative weight values to be assigned to links to reflect the call-blocking probabilities. Working with a wide variety of switches, it removes from the individual switches the burden of determining administrative weights of links. The separate module for this species is called a Type II administrative weight network management station.

Aspects of the invention lie both in the methods and the apparatuses for achieving these results.

Further features and advantages of the present invention, as well as the structure and operation of various species of the present invention, are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

Preferred implementations of the various aspects of the invention will now be described while referring to the figures, several of which may be simultaneously referred to during the course of the following description.

The choice for appropriate metrics for administrative weights (AWs) is limited to ones that are additive over a path.

The administrative weights are used in the computation of shortest path routes. They have to be set such that they satisfy the following characteristics:

- An AW metric is associated with each link in the system. Each link can have one AW metric for each service category.
- The AW of a path must be the sum of the AWs of the component links.
- The paths with lower AWs are preferred by path selection over paths with higher AWs.

According to the present invention, call-blocking probabilities are used as a metric for assignment of administrative weights and enable more efficient operation of the network, and particularly provide less denial of service.

Figure 1:
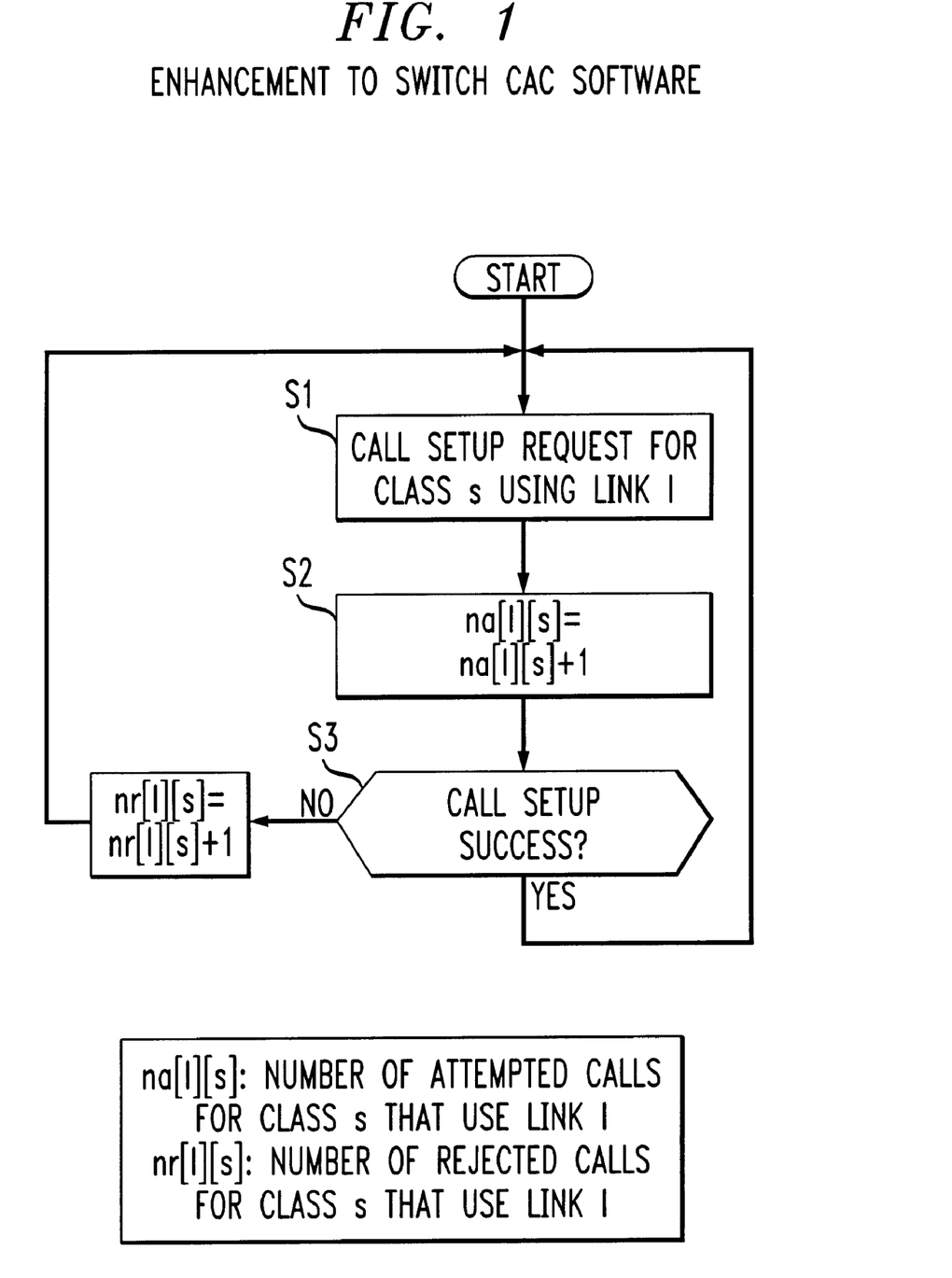
FIG. 1 shows a flow chart of the supplemental software of the first species of the invention.

FIG. 1 illustrates a preferred implementation of the invention in which each of the substantially identical switches is capable of employing supplemental software for calculating call-blocking probabilities for each class of service for each of the communication links to which it is connected. In selecting connections through those links, the switch assigns administrative weights related to those call-blocking probabilities. The flow chart of FIG. 1 illustrates how the supplemental software works. Software for calculating call-blocking probability is added to the Connection Admission Control (CAC), shown in FIG. 3.

In FIG. 1 at step S1 there is received at the switch, for example, a call setup request for class s using link 1. The switch has collected and recorded for a relevant time period the number of attempted calls for class s that use link 1 and the number of rejected calls for class s that use link 1. The new request causes the count of attempted calls to increment by one in step S2. Step S3 represents the decision process in which it is decided whether the call can be successfully set up. This occurs if the requirements for a call of class of service s can be met. If the call is not successfully set up, the count of rejected calls is incremented by one in step S4. The method then returns to step S1 to check the next call setup request.

Call Blocking Probabilities and Administrative Weights

Let there be k classes of traffic. Let $b_{l,k}$ denote the call-blocking probability (CBP) of class k calls on link l. Using the link independence assumption, the CBP of a route r can be computed as:

$$B_{r,k} = 1 - \prod_{l \in r}(1 - b_{l,k}) \quad (1)$$

For small values of $b_{l,k}$ this can be approximated as $$B_{r,k} \approx \prod_{l \in r} b_{l,k} \quad (2)$$

So, if we assign link AWs for each link 1 for class k proportional to $b_{l,k}$, then the AWs would satisfy the requirements outlined earlier, namely, The AW of a path would be an additive function of the link AWs, enabling the use of an algorithm, such as Dijkstra's algorithm, for computing shortest paths.

Paths with lower AWs are preferred by path selection over paths with higher AWs.

The exact expression for the call-blocking probability (CBP) of a path (using the independent link assumption) is given in Equation (1). It is possible to assign link weights based on the expression rather than the approximation of Equation (2) as follows.

$$-B_{p,k} = \prod_{l \in p}(1 - b_{l,k}) \quad (3)$$

$$\Rightarrow \log(1 - B_{p,k}) = \sum_{l \in p} \log(1 - b_{l,k})$$

By assigning link weights proportional to log $(1-b_{l,k})$ we could retain the desired additive property of the AWs. However, with these weights, the higher the AW the better the path, implying that now we need to compute the longest paths in the network instead of using Dijkstra's algorithm to compute the shortest paths. This problem is, however, NP-hard, rendering the product form expression unsuitable for assigning AWs. Problems that are NP-hard are believed to be too complex to be solved in a reasonable time.

Two terms, traffic class and traffic type, are needed below for the description of the invention. The term traffic class (TC) is defined as TC={service category, source traffic descriptor (STD) range, and quality of service (QoS) range} where the service category indicates the type of service. For example, for an ATM (asynchronous transfer mode) network, it is one of the five categories supported in ATM Forum, "Traffic management specification version 4.0," af-tm-0056.000, April 1996., in packet switched networks, the STD range is the set of allowed source traffic descriptor values $PR_{low} < PR \leq PCR_{high}$, $SR_{low} < SR \leq SR_{high}$, $MBS_{low} < MBS \leq MBS_{high}$, where PR, SR, and MBS are the peak rate, sustainable rate and maximum burst size, respectively; in circuit-switched networks, the STD range is the set of allowed rates $R_{low} < R \leq R_{high}$, in packet switched networks, the QoS range is the set of allowed quality of service parameter values $LR_{low} < LR \leq LR_{high}$, $DV_{low} < D \leq DV_{high}$, $TD_{low} < TD \leq TD_{high}$, where LR, DV and TD are the loss ratio, peak-to-peak delay variation and maximum transfer delay, respectively.

Associated with each traffic class is a grade of service requirement, which represents the call-blocking probability acceptable for this class.

A traffic type is associated with each traffic class. The traffic type associated with a traffic class has the same service category as that of the traffic class, the peak values of the STD parameter ranges of the associated traffic class, and the minimum values of the QoS parameter ranges of the associated traffic class. In effect, the most stringent parameters of a traffic class constitute the traffic type.

The reason for defining traffic classes and associated traffic types is explained below. Call arrival and departure rates and their corresponding equivalent bandwidth requirements are needed for many network management applications, such as provisioning and AW assignments. Achieving a certain requirement for call blocking probability is often the main consideration of such network management applications. When calls of multiple traffic types are multiplexed, a multiservice call blocking formulation, such as that of J. S. Kaufman, "Blocking in a shared resource environment," IEEE Trans. Comm., vol. 29, pp. 1474–1481, October 1981.), is needed to compute call-blocking probabilities for each traffic type. Such formulations assume a discrete number of multiplexed traffic types. This requires that a discrete set of traffic classes (and associated traffic types) be created to manage the infinite numbers of call types possible since STD and QoS parameters of calls could take any value. Furthermore, without such a discrete set of traffic classes, keeping a call arrival count for calls for each combination of values for these parameters is an impossible task, since an infinite set of combinations are possible. By creating traffic classes, one maintains a discrete set of call arrival counts, where the call arrival count for a traffic class k consists of all calls whose STD and QoS parameters fall within the pre-specified ranges of class k. Call-blocking probabilities are then computed under the assumption that all calls of this traffic class need bandwidth allocations of the traffic type associated with the class. In other words, the worst case requirements of a call belonging to this traffic class are assumed for all calls of this traffic class for provisioning purposes and/or AW assignment.

If the ranges of traffic classes are large, the total number of call arrival counts that need to be maintained is small, but resource utilization will be sacrificed. On the other hand, if the ranges are small, the number of call arrival counts needed and the complexity of computing multi-service call blocking probabilities increases, but resource utilization will be better than if ranges are large. Thus, a prudent choice of the number of traffic classes is needed.

The creation of traffic classes within a service category is only needed for management purposes. It is not meant to limit the values of STD and QoS parameters requested in a call setup message. The freedom of choice available to the user, in requesting any value of cell rate and/or any quality of service, can still be supported. However, without the notion of traffic classes, managing communication networks becomes a difficult task.

While the use of traffic classes and traffic types will be required in the implementations of the invention that follow, the implementation of FIG. 1 does not require it. Specifically, the implementation of FIG. 1 works with call related data for each service category and is hence completely compatible with existing standards. It provides a solution from the "switch perspective" for each sufficiently capable switch. In other words, it provides a solution to assign AWs to the interfaces of such switches, but does not provide a "customer view" solution for assigning AWs for interfaces of all switches in the customer network. The following implementations address this issue.

Figure 2:
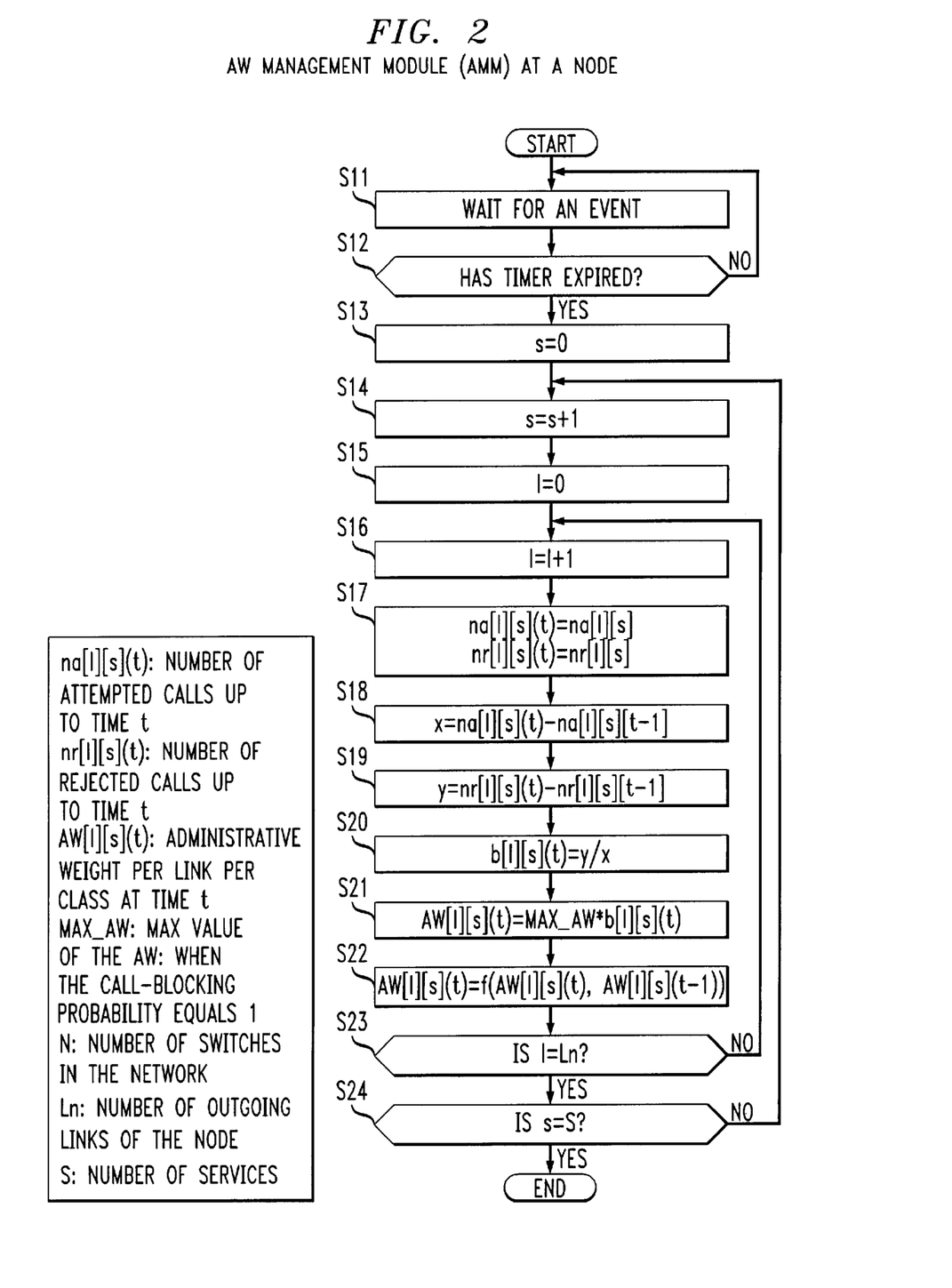
FIG. 2 shows a flow chart of software that implements the AW management module of the first species of the invention at a node.

The implementation of FIG. 2 uses call-related data at a node to compute administrative weights for a number of nearby switches. While these computations affect the processing of calls, according to the first species of the invention, FIG. 2 does not illustrate the flow of calls through the network.

While the CAC software running on each switch is enhanced to keep track of $n_a^{l,j}$(FIG. 1), the number of calls of service category j that were attempted over each link l, within a specified timeframe, as well as the number rejected $n_r^{l,j}$, the AW Management Module (AMM), as shown in FIG. 2, derives the AW as an integral value proportional to the CBP. It then communicates this new AW to the appropriate software, such as the Private Network-Network Interface protocol (PNNI) software, which advertises this as the AW for service category j for the link l.

In FIG. 2 are described the steps for the calculation of the ratio (steps S11–S20), as well as the steps for the conversion (steps S21 and S22). Step S11 waits for an event and times the wait. Step S12 determines whether the specified timeframe has expired. If an event (a request) has occurred and the timeframe has not expired, the process is maintained in waiting mode step S11, so that all the attempts and rejections within that time period can be accumulated. If the timeframe has expired, the numbers for the timeframe are forwarded and s, the number of services, is advanced from zero, initially, at step S13 to s+1 at step S14. The number of outgoing links at the node is advanced from zero, initially, at step S15 to l+1 at step S16. Step S17 keeps track of all call attempts and all call rejections for each link and each class of service up to time t. But the call attempts for each timeframe are stored at step S18; and the rejections for each timeframe are stored at step S19. A simplest form of a call blocking probability is obtained as a ratio of timeframe rejections to timeframe attempts at step S20.

At step S21, administrative weight is obtained as a number directly related to the call blocking probability obtained at step S20. A maximum value is multiplied by the CBP since the latter is a fraction and typically AWs are greater than 1. Step S22 determines the new value of administrative weight as a function of both the AW determined for the current period of time and the AW of the previous period.

Steps S23 and S24 check whether the process has incremented through all the relevant links and all classes of service and, if not, return the process respectively to step S16 and step S14. All of the data for each link and each class of service is stored for appropriate use.

Figure 3:
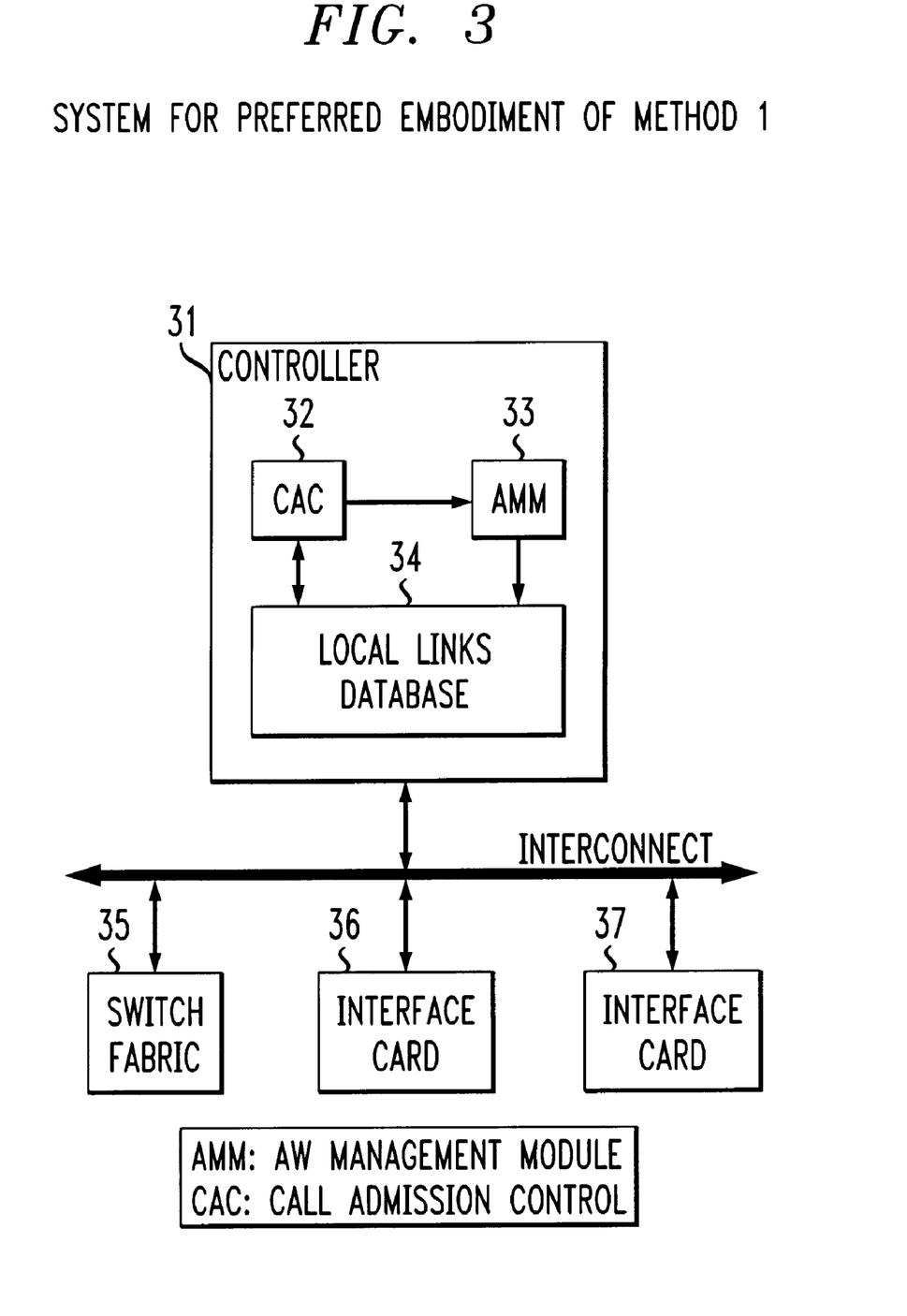
FIG. 3 shows a block diagram of a preferred embodiment of each of the individual switches using the method of FIG. 1.

FIG. 3 shows a preferred system implementation for the methods of FIG. 1 and FIG. 2. Controller 31 is disposed at a switch having a Connection Admission Control 32. The enhanced software of FIG. 1 can be located in an administrative weight management module within controller 31 so that both the Connection Admission Control 32 and the Administrative Weight Management Module 33 have access to a common database 34 for all of the local communication links with which it is connectable. The new element in controller 31 is the Administrative Weight Management Module 33. The controller 31 is connected via a local bus with the ATM switch fabric 35 and various interface cards 36 and 37 for local communication links (not shown).

While the embodiment of FIG. 3 has been described for implementation with the methods of FIG. 1 and FIG. 2, it should be apparent that it could be moved away from a particular switch to a node in the network convenient to several switches if controller 31 has access to a Call Admission Control 32, or equivalent, for each of the switches, and if inconsistencies are minimal. Such an adaptation could yield a more customer-oriented performance, rather than a switch-oriented performance. Nevertheless, with such a disposition of the Administrative Weight Management Module 32, a modified method, as explained hereinafter, may become advantageous.

A network-wide optimization becomes feasible, according to the second species of the invention, even if the switches are not identical, if they are sufficiently similar and capable. The switches need to collect call arrival and departure information for calls of all categories, plus the routes of calls. Such a network optimization can be a network revenue maximization.

Assume that for the network under consideration, the traffic arrivals between each pair of nodes i and j for each traffic class k is Poisson with mean rate $\Lambda_{ij,k}$ and the call holding time of class k calls is exponentially distributed with mean $1/\mu_k$. Let $R_{ij,k}$ denote the set of routes for class k calls between i and j, and $r \in R_{ij,k}$. Let the mean call arrival rate on route r be $\lambda_r$. Denote the revenue per call on this route as $e_r$. Let $B_{r,k}$ be the CBP of class k calls on route r. Then the long-term revenue can be written as $$\dot{W} = \sum_{\forall i,} \sum_{j \forall k} \sum_{\forall r \in R_{ij,k}} e_r \times \frac{\lambda_r}{\mu_k} \times (1 - B_{rk}) \qquad (4)$$

where the ratio $$\frac{\lambda_r}{\mu_k}$$

is called the traffic intensity of class k traffic on route r, denoted by $p_{r,k}$. The aim is to maximize the network revenue subject to the following constraint $$\sum_{r \in R_{ij,k}} \lambda_r \leq \Lambda_{ij,k} \qquad (5)$$

for each node pair i and j, for each traffic class k. The set $\{\lambda_r : \forall r\}$ are design variables. The CBP for each class k route r is computed as shown in equations (1) and (2), from the link CBPs.

Existing switches do not collect the data that would enable the direct calculation of call-blocking probability for each link as a simple ratio. To compute link CBPs, assume that the capability of link l is $C_l$. Let calls of type k have a bandwidth requirement of $C_k$ per call. Each route $r \in R_l$ contributes to the load experienced by the link. However the load on l is reduced by independent thinning by all the other links along r, see D. Mitra, J. A. Morrison, and K. G. Ramakrishnan, "ATM network design and optimization: A multirate loss network framework," in *Proc. IEEE Infocom*, pp. 994–1003, 1996). The thinned load on link 1 due to traffic class k is denoted by $v_{l,k}$. Then, the blocking probability $b_{l,k}$ is expressed as $$b_{l,k} = B(\{c_1, \ldots, c_k\}, \{v_{l,1}, \ldots, v_{l,k}\}, C_l) \quad (6)$$

where B(.) is given by the multi-service CBP formulation and Cl...Ck are the equivalent bandwidths needed for each class of service. A recursive procedure for computing $b_{l,k}$ is proposed in J. S. Kaufman, "Blocking in a shared resource environment," *IEEE Trans. Comm.*, vol. 29, pp 1474–1481, October 1981.). The thinned loads are computed as follows:

$$v_{l,k} = \sum_{ij} \sum_{r \in R_l} p_{r,k} \prod_{l^1 \in r-l} (1 - b_{l_1,k}) \quad (7)$$

The values of $b_{l,k}$ and $v_{l,k}$ are obtained by iterating over Equations (6) and (7).

The above procedure for computing CBPs has a complexity of $O(C_l)$. While this works for small-capacity networks, it is impractical for larger networks. See D. Mitra and J. A. Morrison, "Erlang capacity and uniform approximations for shared unbuffered resources," *IEEE Trans. Networking*, vol. 2, pp. 559–570, December 1994.) gives a more efficient method called the Uniform Asymptotic Approximation (UAA) for the same problem. The complexity of calculating link call blocking probabilities with UAA is O(1), i.e., bounded as Cl→∞.

AWs are assigned based on network revenue optimization. The result of the optimization to maximize the network revenue as expressed in Equation (4) is the value of the variables $\lambda_r$, the distribution of traffic on the different routes. Also computed are the link CBPs $b_{l,k}$ for each link l for each traffic class k. The Administrative Weight Manager (AWM) is a network management application which performs the optimization and computes a set of per-traffic-class AWs for each link based on the link CBPs.

Figure 4:
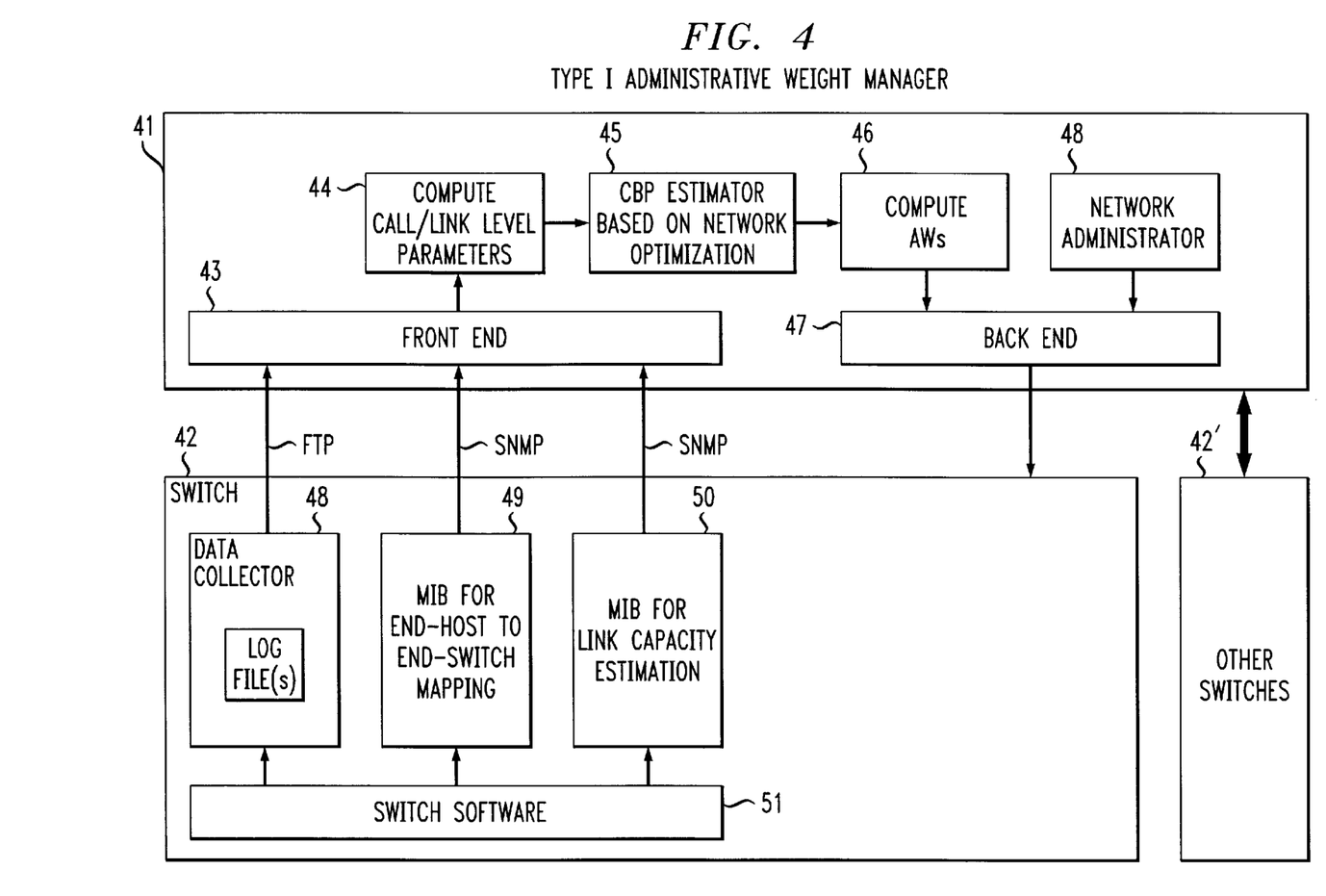
FIG. 4 shows a block diagram of a preferred embodiment of an AW network management station implementing the second species of the invention.

FIG. 4 shows the system organization for a Type I Administrative Weight Manager for use in the second species of the invention. In administrative weight manager 41, front end 43 collects data from switch 42 and the other similar switches 42'. Computational module 44 computes call and link level parameters described above. Call-blocking-probability estimator 45 calculates the per-class CBP for each link, using a network optimization scheme of the type described in equations (4)–(7). From the call-blocking-probabilities from estimator 45, computational module 46 computes administrative weights, much as explained above. A network administrator, or an administration function 48, has the option of overriding these values if the need arises. The results are sent back to the switches 42, 42' by back end 47.

Components 48, 49, 50, and 51 of switch 42 are the switch components involved in data collection.

Figure 5:
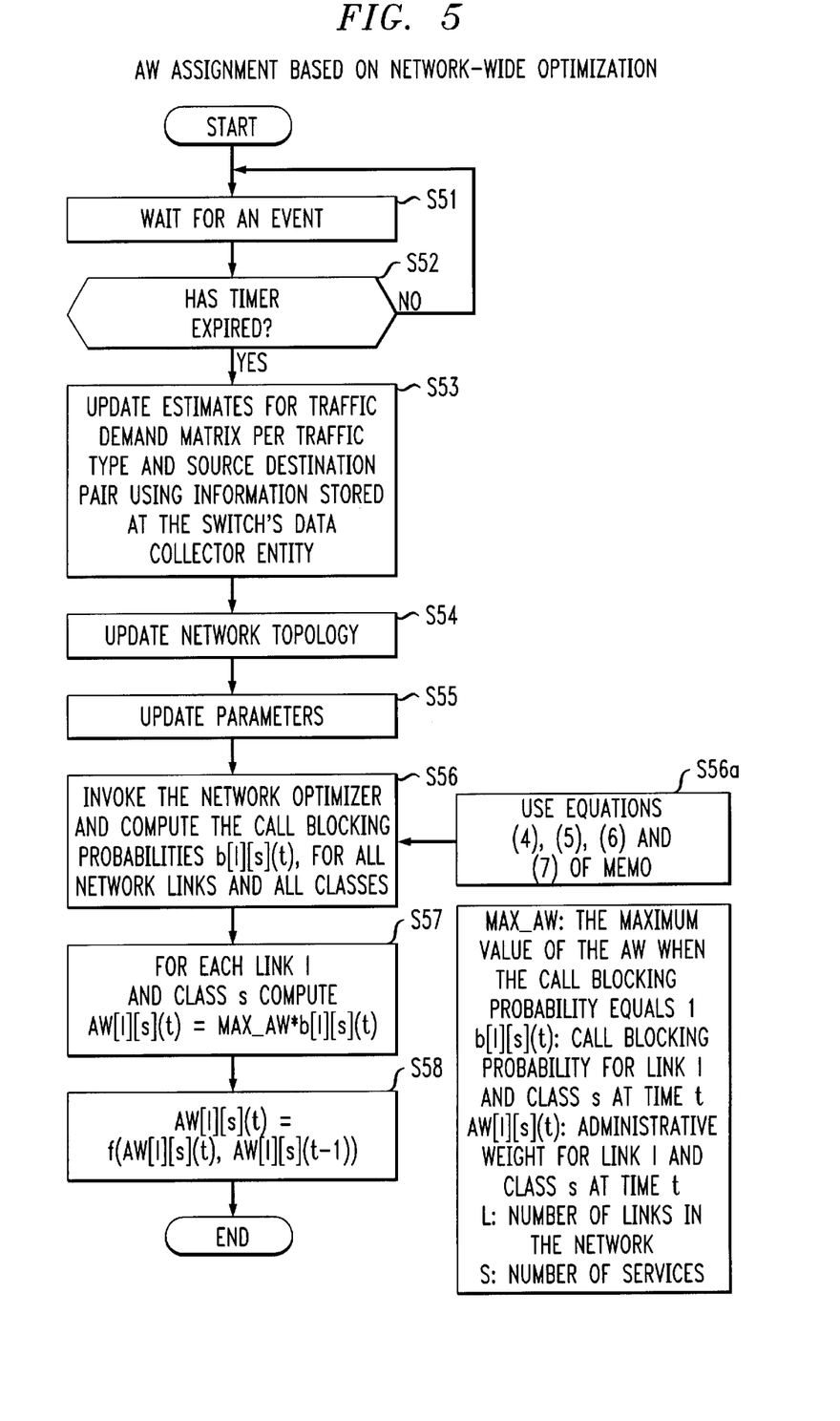
FIG. 5 shows a flow chart of software that implements the AW network management station of the second species of the invention.

FIG. 5 shows a flowchart that is a software-based implementation for the second species of the invention of a method for implementing blocks 44 and 45 of FIG. 4 and performing the mathematics described above, equations (4)–(7), for a network-optimizing (Type I) Administrative Weight Manager.

In FIG. 5, steps S51 and S52 are essentially similar to steps S11 and S12 of FIG. 2. When the first timeframe has expired, the counted events are used in step S53 to update estimates for a traffic demand matrix including traffic type and source-destination pair information, using information stored at a switch's data collector entity 48 of FIG. 4. Step S54 updates the network topology stored in management information base 49 of each switch or, alternately, stored at the node where administrative weight manager 41 is located. Step S55 updates parameters based on the calculations in computational module 44. Step 56 invokes the network optimizer routine of CDP estimator 45 and computes the call blocking probabilities for all network links and all classes, using equations (4)–(7) above (step S56a). Steps S57 and S58 are essentially similar to steps S21 and S22 of FIG. 2, above. Specifically, at step S57, administrative weight is obtained as a number directly related to the call blocking probability obtained at step S56. The maximum value of this number over a period of time is also stored at step 57 and lesser values of administrative weight during that period of time are not retained. Step S58 determines the new value of administrative weight as a function of the AW computed for the current period of time and the AW computed for the previous period of time.

Figure 6:
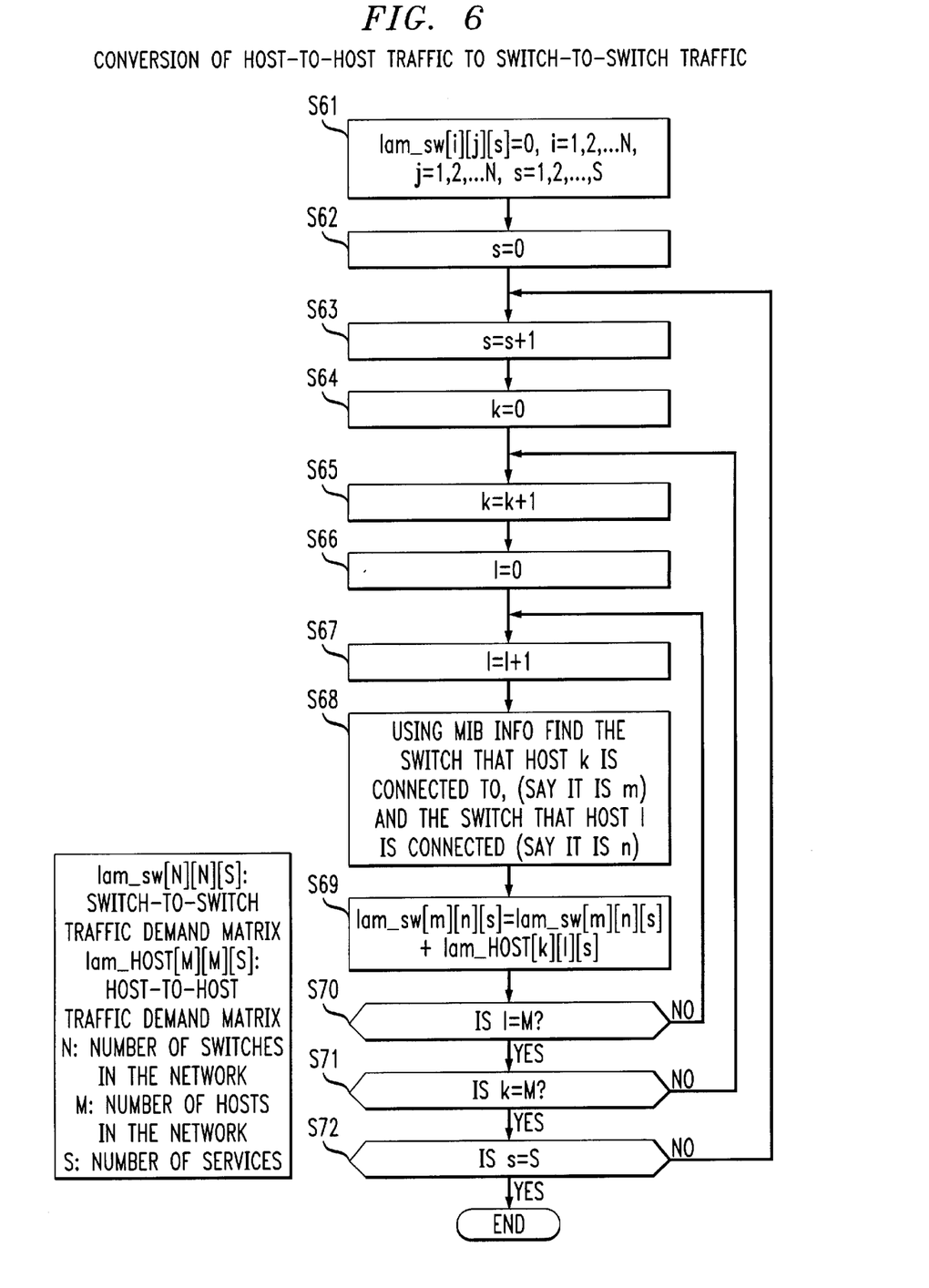
FIG. 6 shows a flow chart for conversion of host-to-host traffic to switch-to-switch traffic for use in the second species of the invention.

In FIG. 6 is shown a flowchart of a procedure to convert host-to-host traffic to switch-to-switch traffic to facilitate the method of FIG. 5 in calculating administrative weights according to the second species of the present invention.

In FIG. 6, step S61 starts the conversion at an initial zero condition of the Lam_sw[N][N][S] switch-to-switch traffic demand matrix, where i=1,2, ... N, j=1,2, ... N, s=1,2, .. . S. Step S62 sets s =0; and step S63 increments s by 1, so long as s has not reached its limit S (step 72, hereinafter). Step S 64 sets k =0;s and step 65 increments k by 1, so long as k has not reached its limit M (step 71, hereinafter). Step 66 sets l=0; and step 67 increments l by 1 if l has not reached its limit M (step 70 hereinafter).

Step S68 finds the switch that host k is connected to (for example, m) and the switch that host 1 is connected to (for example, n). Step S69 sets a new value of the switch-to-switch traffic demand matrix to be equal to its current value plus the value of the host-to-host traffic demand matrix for those particular hosts.

Decision circuits in steps S70, S71, and S72 respectively determine whether l, k, and s have reached their respective limits and, if not, feed back signals to increment them. Eventually, the respective traffic demand matrices are filled up.

There will now be described a detailed version of the third species of the invention, for convenience called the Type II Administrative Weight Manager, that works in conjunction with switches that employ the databases to collect the number of accepted calls and departures per link for each category of traffic type and link capability. As an example of this type of information, see K. McCloghrie, J. Heinanen, W. Greene, and A. Prasad, "Managed objects for controlling the collection and storage of accounting information for-connection-oriented networks," IETF Draft draft-ietf-atommib-acct-03.txt, July 1996.) and ATM Accounting Information MIB K. McCloghrie, J. Heinanen, W. Greene, and A. Prasad, "Accounting Information for ATM networks," IETF Draft draft-ietf-atommib-acct-03.txt, July 1996). Both of these articles are incorporated by reference herein in their entireties.

Again, suitable data for calculating a call-blocking probability ratio are not directly available. Instead, such ratios would be solutions of a set of simultaneous equation in several unknowns.

For an iterative method for computing administrative weights, one can write CBP for traffic class k on a link l in the network as $$b_{l,k} = f(\{c_1, \ldots, c_k\}, \{\rho_1, \ldots, \rho_k\}, C_l) \quad (8)$$

where $C_k$ is the bandwidth of a type k call and $\rho_k$ is the traffic intensity of a class k call, on link l and $C_l$ is the bandwidth of link l. The term $\rho_k{}^a$ denotes the intensity of accepted traffic of class k and can be written in terms of the CBP for class k calls on link l as $$\rho_k{}^a = \rho_k \times (1 - b_{l,k}) \quad (9)$$

For example, the ATM Accounting Information MIB provides information about $C_k$, and $\rho_k{}^a$ for each traffic class basis but not $\rho_k$. The AW management module on each switch reads this information from the MIB and computes the link CBPs by performing a fixed-point iteration over Equations (8) and (9). The AWs are computed from the link CBP $b_{l,k}$.

In order to compute the estimated call blocking probabilities for each class of traffic for each link, the administrative weight manager (AWM) has to first read link capacity information about each link in the system and call level statistics like numbers of calls admitted on each switch interface per class, and call holding time. The link capacity information is obtained from a suitable MIB implemented on the switch, such as the AtoM MIB in FIG. 9. Accounting MIBs typically maintain call-level statistics on a per-interface basis. Next is described how the call level statistics that are needed for this species of the current invention can be acquired Management Information Bases, such as the Connection-Oriented Accounting MIB and the ATM Accounting Information MIB, as described in the articles last cited above.

The ATM Accounting Information MIB defines the set of ATM specific accounting information that can be collected for connections on ATM networks. The Connection-Oriented Accounting MIB manages objects used for controlling and storage of accounting information for connection-oriented networks such as ATM, including the objects defined in the first McCloghrie et al. article cited above. The specified accounting data, which is typically too large to allow direct access via a simple network management protocol (SNMP), is collected into files for later retrieval via a file transfer protocol (FTP).

It is desired to gather information about service classes (SVCs). For each SVC associated with this switch, one needs information about the calling party, called party, start time, end time, service category and the traffic descriptor to be collected. According to this third species of the present invention, specified below is the information to be gathered at the switch as a set of objects in the Connection-Oriented Accounting MIB. From the methodology of the second McCloghrie et al. article, details are given below.

One can compute the link CBPs using the method outlined above, using Equations (8) and (9).

The items of accounting data to be collected are specified as a set of objects in a suitable database, for example, in a Connection-Oriented Accounting MIB. The objects contained in such a set are selectable by an administrator through the specification of one or more (subtree, list) tuples, where the set of objects to be collected is the union of the subsets specified by each tuple. References to ATM ("Atm" or "atm") below are merely from an example; for corresponding data for other types of switches, the same procedure is applicable.

"subtree" specifies the Object Identifier (OID) value such that every object in the subset is named by the subtree's value appended with a single additional sub-identifier.

"list" specifies an octet string value, such that if the N-th bit of the strings value is set then the subset contains the objects named by appending N as the single additional sub-identifier of the subtree.

TABLE 3

MIB Objects and Object Identifiers (OIDs) of interest For an ATM Network Example

| Information | Object | OID |
| --- | --- | --- |
| Calling party | AtmAcctngCallingParty | {atmAccountingDataObjects 7} |
| Called party | AtmAcctngCalledParty | {atmAccountingDataObjects 8} |
| Start time | AtmAcctngStart Time | {atmAccountingDataObjects 10} |
| Collection time | AtmAcctngCollectionTme | {atmAccountingDataObjects 11} |
| Collect mode | AtmAcctngCollectMode | {atmAccountingDataObjects 12} |
| Service category | AtmAcctngServiceCategory | {atmAccountingDataObjects 14} |
| Traffic parameter 1 | AtmAcctTransmitTraffic DescriptorParam1 | {atmAccountingDataObjects 20} |
| . | . | . |
| . | . | . |
| . | . | . |
| Traffic parameter 5 | atmAcctTransmit Traffic-DescriptorParam5 | {atmAccountingDataObjects 24} |

Of interest are all SVC connections for which the current node is the originator and would like to collect information about the calling party, called party, start time, end time, and service category. Each entry has the following format.

```
AcctngSelectionEntry ::=
    SEQUENCE {
        acctngSelectionIndex      Integer32,
        acctngSelectionSubtree    DataCollectionSubtree,
        acctngSelectionList       DataCollectionList,
        acctngSelectionFile       FileIndex,
        acctngSelectionType       BITS,
        acctngSelectionState      INTEGER,
        acctngSelectionRowStatus  RowStatus
    }
```

The item "acctngSelectionIndex" uniquely identifies each tuple stored in the table.

The items "acctngSelectionSubtree" and "acctngSelectionList" specify one (subtree, list) tuple to be collected. In our case, "acctngSelectionSubtree" would be the OID of the subtree we are interested in, namely "{atmAccountingDataObjects}", which is the same as "{atmAccountingInformationMIB 1}" referred to in the first above-cited article by McCloghrie et al. The "acctngSelectionList" would be the octet string corresponding to the subset of objects we are interested in collecting. The objects of interest, and the corresponding MIB objects and the OIDs are given in Table. 3, above.

Note that the end time of the call is the same as the collection time if the collect mode is on Release. The above set of objects are encoded into the octet string "03 74 1F 00 00 00 00 00" (the trailing zeros can be dropped), which is the value of "acctngSelectionList". The object "acctngSelectionFile" indicates the file into which the accounting information identified by this entry is to be stored.

Also, acctngSelectionType is set to "0" for svcIncoming and "1" for svcOutgoing. The creation of this row takes effect on the next "swap" of the identified file. accntgSelectionState is a read-only object that takes the value next (1) when waiting for the next "swap" and current (1) once the "swap" occurs. Note that accntgSelectionRowStatus is the status of this row.

Figure 7A:
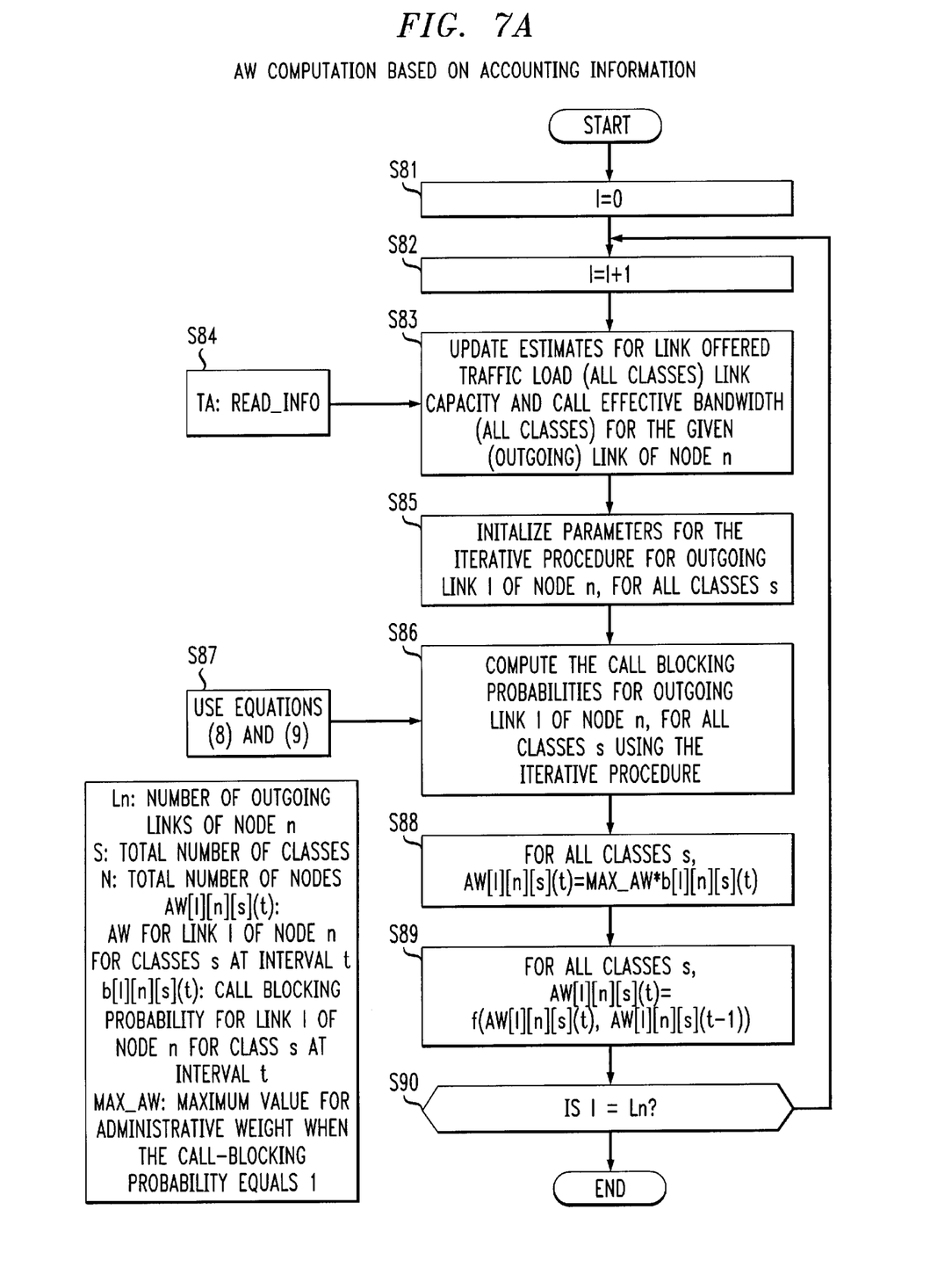
FIG. 7A shows a flow chart of a method for administrative weight computation based on accounting information for the third species of the invention.
Figure 7B:
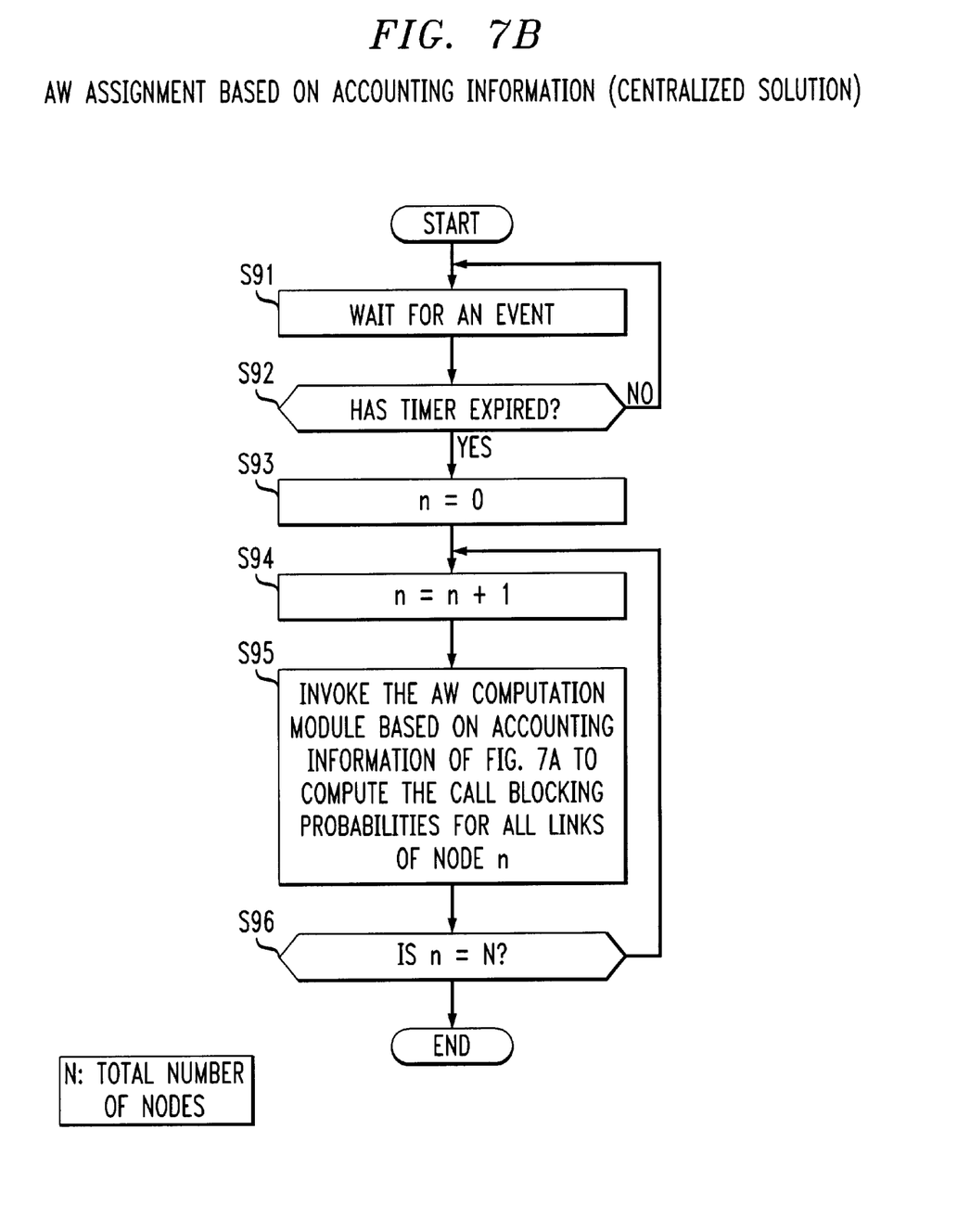
FIG. 7B shows a flow chart of a method for adapting the administrative weight computation of FIG. 7A for use in a centralized solution for the network.
Figure 7C:
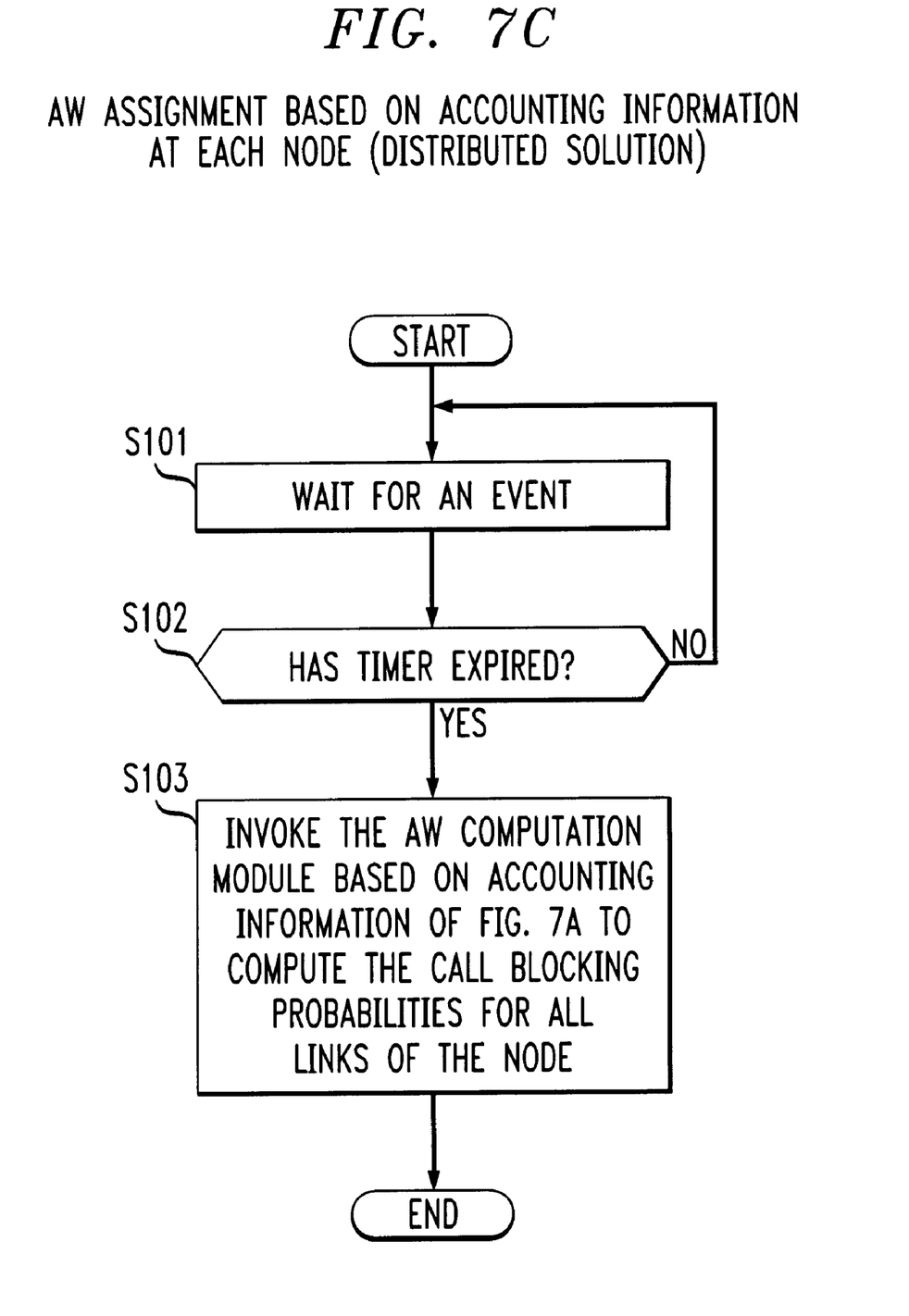
FIG. 7C shows a flow chart of a method for adapting the administrative weight computation of FIG. 7A for use in a distributed implementation of the third species of the invention.
Figure 8:
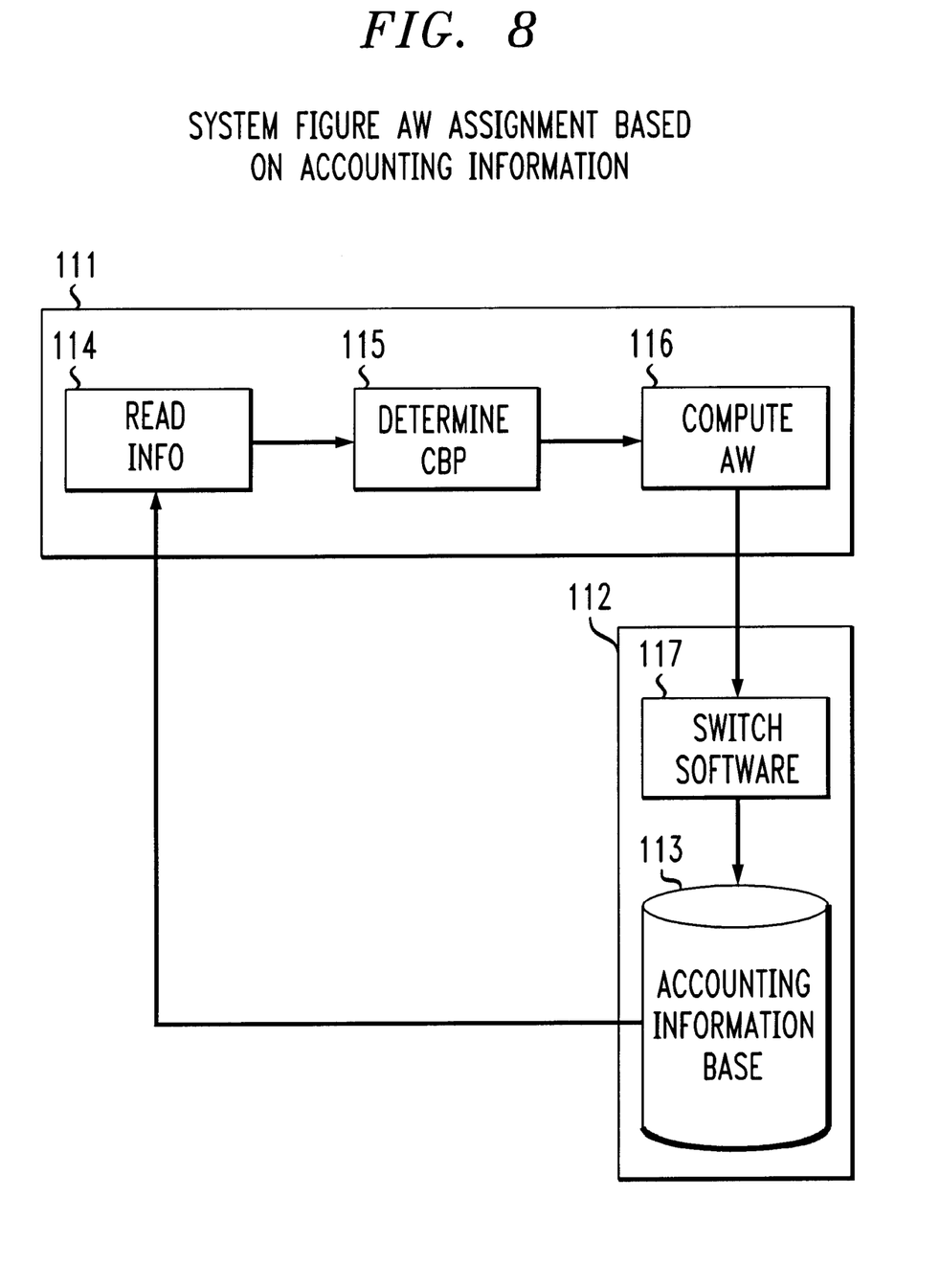
FIG. 8 shows a block diagram of a system for administrative weight assignment using either of the methods of the third species of the invention.

FIGS. 7A–7C show flow diagrams of related digital processor-based methods of carrying out the accounting information mathematics set out above in equations (8) and (9) and of implementing the administrative weight assignment system of the third species of the invention, a system configuration of which is shown in FIG. 8.

In FIG. 7A, step S81 starts the link count 1 at zero. When this count has not reached the allowed maximum, Ln, step S82 increments the count by one. Step S83 updates estimates for link-offered traffic load (all classes), link capacity, and call effective bandwidth (all classes) for the given outgoing link of node n. Step S84 reads information into step S83 from block TA, shown in FIG. 9. Step S85 initializes parameters for the iterative procedure for outgoing link l of node n, for all classes s.

Step S86 computes the call blocking probabilities for outgoing link l of node n, for all classes s using the iterative procedure. As indicated at Step 87, which is actually internal to step S86, the iterative procedure uses the mathematics of equations 8 and 9, above. In step S88, for all classes s, the administrative weight of link 1 at node n for the current timeframe is set equal to the maximum calculated administrative weights for a range of current time periods times the call-blocking probability. Step S89 sets the value for this time period as a function of the newly-computed AW for this time period plus the cumulative AW for the previous time period, t−1. Step S90 determines whether the link count has reached the maximum Ln, and, if not, allows step S82 to increment the count. If it has reached the maximum, the process is stopped.

While the method of FIG. 7A can be used with either FIG. 7B of FIG. 7C, the method of FIG. 7B adapts the method of FIG. 7A to be a centralized solution for N nodes.

In FIG. 7B, as in FIG. 2, Step S91 waits for an event and times the wait. Step S92 determines whether the specified timeframe has expired. If an event (a request) has occurred and the timeframe has not expired, the process is maintained in waiting mode step S91, so that all the attempts and rejections within that time period can be accumulated. If the timeframe has expired, the numbers for the timeframe are forwarded and n, the number of nodes, is advanced from zero, initially, at step S93 to n+1 at step S94. Step S95 refers the process back to FIG. 7A to compute administrative weight.

Step S96 determines whether n has reached the maximum value N; and, if it has not, allows step S94 to increment the count.

In contrast to FIG. 7B, FIG. 7C shows a distributed solution using accounting information to calculate call blocking probabilities and, then, administrative weights.

Again, the method of FIG. 7A is incorporated.

Step S101 waits for an event and times the wait. Step S102 determines whether the specified timeframe has expired. If an event (a request) has occurred and the timeframe has not expired, the process is maintained in waiting mode step S101, so that all the attempts and rejections within that time period can be accumulated. Step S103 refers the process back to FIG. 7A to compute administrative weight. In this case, multiple versions of the process of FIG. 7A will be running independently.

FIG. 8 shows a block diagram of a communication system using the methods of FIG. 7A and either FIG. 7B or 7C. A digital arithmetic module 11 receives information from a number of switches, such as switch 112, and also from the accounting information base 113, to which the switch has access.

The arithmetic module 111 includes reading module 114 for reading the required information, the arithmetic unit 115 for determining call blocking probability, and the computational unit 116 for converting call blocking probabilities to administrative weights for the particular communication link and class of service. Unit 116 reports its results to the switch software 117 of switch 112.

Figure 9:
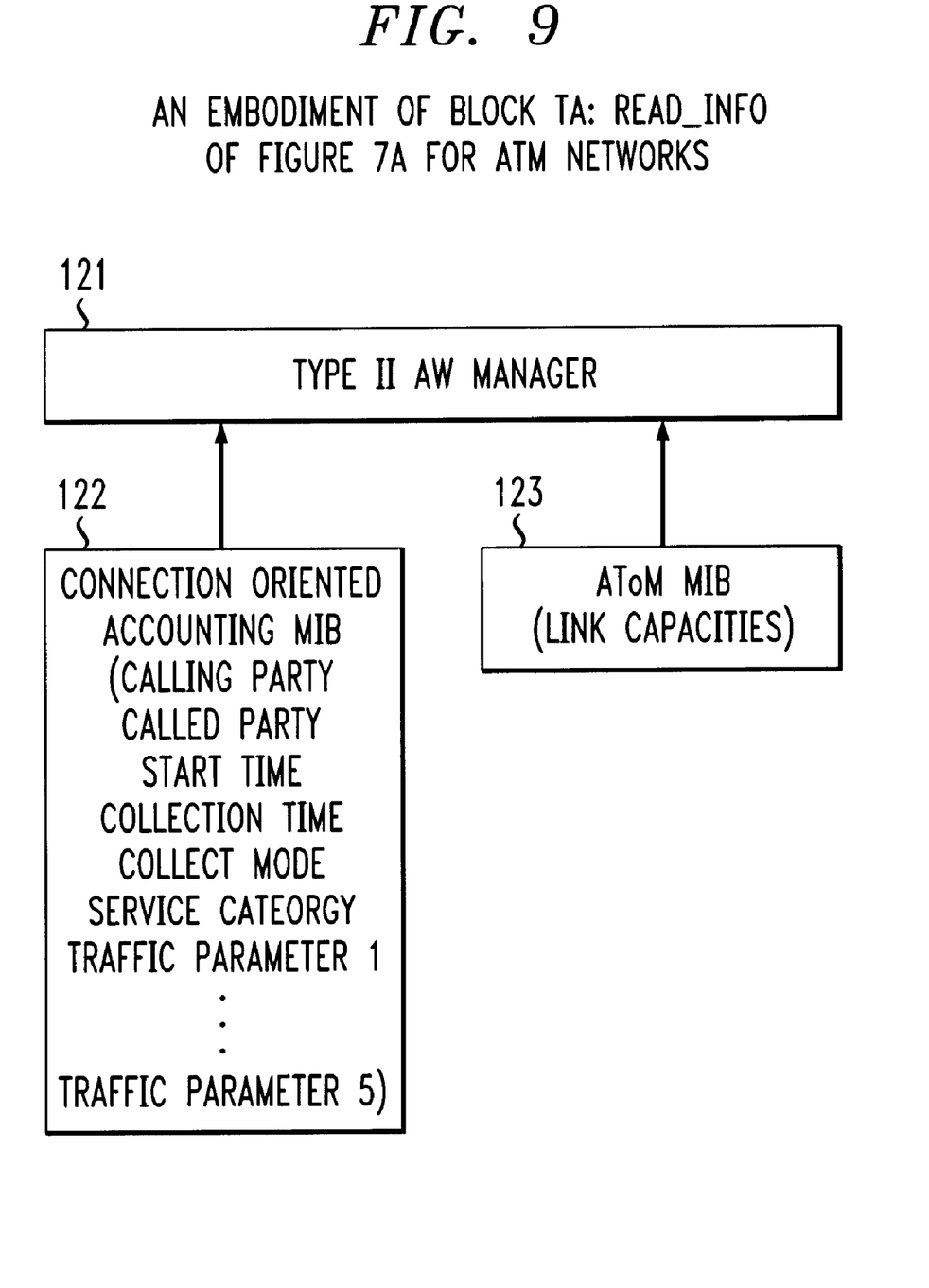
FIG. 9 shows a block diagram of an apparatus for implementing block 7A of FIG. 7A.

In FIG. 9 is shown a preferred implementation of block TA applicable in QTM networks, associated with step S84, in FIG. 7A.

In FIG. 9, block 121 is called a Type II Administrative Weight Manager, including the digital processor or processors that perform the steps of the method of FIG. 7A.

Type II Administrative Weight Manager 121 collects accounting type information from the connection-oriented accounting management information base (MIB) 122 and from AtoM management information base (MIB) 123. The latter provides information regarding communication link capacities. MIBs 122 and 123 are well-described in the literature. The structure and characteristics of Type II Administrative Weight Manager 121 are readily apparent from its data-collection functions shown and from the requirements of the method of FIG. 7A.

In addition to its data processing capabilities, optionally, the Type II Administrative Weight Manager may have a monitor and may have audio output functions and a keyboard (not shown) so that a human operator can interact with it.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The claimed invention is:

1. In a communication network including a plurality of switches and a plurality of communication links that can be interconnected by at least one of said plurality of switches to form a communication path characterized by a class of service, a method for assigning administrative weights to said plurality of communication links, comprising the steps of:

computing for said class of service a call blocking probability at each of said plurality of switches; and assigning for said class of service an administrative weight to a respective one of said plurality of communication links directly related to the computed call blocking probability of the respective one of said plurality of communication links.

2. The method according to claim 1, wherein the steps are performed at each one of said plurality of switches for the at least one of said plurality of communication links that can be interconnected by said one of said plurality of switches, the method further comprising the steps of:

recording for said class of service the number of call setup requests arriving at each of said plurality of switches via each of said plurality of communication links; and recording for said class of service the number of call setup requests rejected at each of said plurality of switches for each of said plurality of communication links.

3. The method according to claim 2, wherein the manners of performance of the steps by the plurality of switches are essentially identical.

4. The method according to claim 1, wherein the plurality of switches have available accounting data relating to service class, traffic matrix, link capacities, and bandwidth requirements, and the step of computing call-blocking probabilities involves recursively calculating call-blocking probabilities for each link from the data with the criterion of increasing revenue.

5. The method according to claim 4, wherein the step of recursively calculating involves calculating so that application of the administrative weights will tend to optimize revenue for a network of the switches and the communication links.

6. The method according to claim 1, wherein the plurality of switches differ but have access to like accounting information, including accepted traffic, link capacities, and bandwidth requirements for each class of service, and wherein the step of calculating call-blocking probabilities recursively solves for both offered traffic and call-blocking probabilities.

7. The method according to claim 6, wherein the step of calculating call-blocking probabilities employs the relationships:

for traffic class k on a link l in the network, $$b_{l,k} = f(\{c_l, \ldots, c_k\}, \{\rho_1 \ldots, \rho_k\}, C_l$$

where $C_k$ is the bandwidth of a type k call and $\rho_k$ is the traffic intensity of a class k call, on link l and $C_l$ is the bandwidth of link l, the intensity of accepted traffic of class k, $\rho_k^a$, being written in terms of the CBP for class k calls on link l as $$\rho_k^a = \rho_k \times (1 - b_{l,k}).$$

8. The method according to claim 6, wherein the step of calculating call-blocking probabilities includes recursively solving while including prior values with the last calculated values.

9. The method according to claim 6, wherein each step is performed through all of the nodes in order to provide a centralized solution for the network.

10. The method according to claim 6, wherein each step is performed separately for each of the plurality of nodes in order to provide distributed solutions in the network.

11. A communication network including a plurality of switches, a plurality of communication links that can be interconnected by at least one of said plurality of switches to form a communication path characterized by a class of service, and means for assigning administrative weights to said plurality of communication links, comprising:

means for computing for said class of service a call blocking probability at each of said plurality of switches; and means for assigning for said class of service an administrative weight to a respective one of said plurality of communication links directly related to the computed call blocking probability of the respective one of said plurality of communication links.

12. The communication network according to claim 11, further comprising means for recording for said class of service the number of call setup requests arriving at each of said plurality of switches via each of said plurality of communication links; and means for recording for said class of service the number of call setup requests rejected at each of said plurality of switches for each of said plurality of communication links.

13. The communication network according to claim 11, wherein the plurality of switches are equally capable with respect to collecting and using data.

14. The communication network according to claim 11, wherein the plurality of switches have available accounting data relating to service class, traffic matrix, link capacities, and bandwidth requirements, and further including a separate management unit capable of calculating call-blocking probabilities for each link from the data with the criterion of increasing revenue.

15. The communication network according to claim 14, wherein the separate management unit is capable of calculating so that application of the administrative weights will tend to optimize revenue for a network of the switches and the communication links.

16. The communication network according to claim 11, wherein the plurality of switches differ but have access to like accounting information, including accepted traffic, link capacities, and bandwidth requirements for each class of service, and wherein the separate management unit is capable of calculating call-blocking probabilities by recursively solving for both offered traffic and call-blocking probabilities.

17. The communication network according to claim 16, wherein the separate management unit calculates call-blocking probabilities by employing the following relationships:

for traffic class k on a link l in the network, $$b_{l,k} = f(\{c_l, \ldots, c_k\}, \{\rho_1 \ldots, \rho_k\}, C_l$$

where $C_k$ is the bandwidth of a type k call and $\rho_k$ is the traffic intensity of a class k call, on link l and $C_l$ is the bandwidth of link l, the intensity of accepted traffic of class k, $\rho_k^a$, being written in terms of the CBP for class k calls on link l as $$\rho_k^a = \rho_k \times (1 = b_{l,k}).$$

18. The communication network according to claim 17, wherein the separate management unit recursively solves while including prior values with the last calculated values.

19. The communication network according to claim 11, wherein the means for computing and the means for assigning together include means for calculating through all of the plurality of nodes considered together in order to provide a centralized solution for the network.

20. The communication network according to claim 11, wherein the means for computing and the means for assigning together include means for calculating separately for each of the plurality of nodes in order to provide distributed solutions in the network.

* * * * *